United States Patent [19]

Balaud et al.

[11] Patent Number: 5,157,577
[45] Date of Patent: Oct. 20, 1992

[54] SEALED ELECTRICAL SWITCHGEAR CABINET

[75] Inventors: Philippe Balaud, La Ravoire; Gilbert Velletaz, St. Pierre d'Albigny, both of France

[73] Assignee: Merlin Gerin, France

[21] Appl. No.: 734,680

[22] Filed: Jul. 23, 1991

[30] Foreign Application Priority Data

Jul. 30, 1990 [FR] France ............................. 90 09810

[51] Int. Cl.⁵ .............................................. H02B 1/04
[52] U.S. Cl. .................................. 361/390; 200/43.22; 312/215; 361/335; 361/344
[58] Field of Search ............ 174/52.1, 52.3, 67; 200/50 A, 302.1, 303, 43.22; 220/315, 324; 312/223, 222, 215; 292/34, 37, 38, 25, 27, 29, 46; 361/331, 334, 335, 339, 340, 343, 344, 356, 357, 360, 359, 363, 390, 391

[56] References Cited

U.S. PATENT DOCUMENTS

| | | | |
|---|---|---|---|
| 1,412,242 | 4/1922 | Horton | 361/344 |
| 3,016,432 | 1/1962 | Bassani | 361/344 |
| 3,356,907 | 12/1967 | Bragulat | 361/359 |
| 4,073,000 | 2/1978 | Krejsa | 361/344 |

FOREIGN PATENT DOCUMENTS

| | | |
|---|---|---|
| 0038934 | 11/1981 | European Pat. Off. . |
| 8308793 | 6/1983 | Fed. Rep. of Germany . |
| 2190328 | 1/1974 | France . |
| 91/01583 | 7/1990 | World Int. Prop. O. .......... 361/361 |

Primary Examiner—Gerald P. Tolin
Attorney, Agent, or Firm—Parkhurst, Wendel & Rossi

[57] ABSTRACT

A cabinet for housing modular electrical switchgear is formed essentially by a case on which a cover is tightly fitted, and by a window disposed on the cover to seal an opening arranged on the cover. The window bears on the edge opposite its rotation axis, a lug having a recess receiving a clip-in locking button. The locking button has clip-in fingers which exert a return force on the button in the locked position. The button comprises holes coming in the locked position opposite conjugate holes of the cover for a sealing wire to be fitted. The fixing screws of the cover to the case have holes for the passage of a sealing wire which emerges in an outwardly curved passage, for ease of insertion of the sealing wire.

10 Claims, 10 Drawing Sheets

SEALED ELECTRICAL SWITCHGEAR CABINET

BACKGROUND OF THE INVENTION

The invention relates to a sealed cabinet made of plastic material for housing modular electrical switchgear comprising a bottom case with a symmetrical profile rail for clip-on fixing of the modular switchgear, and a top cover which fits tightly on the case, and which has on the front an for passage of operation handles from the switchgear. A window is disposed to cover the opening and handles when in the closed position, and for giving access to the handles in the open position.

A sealed cabinet, of the kind mentioned, generally located outdoors, provides protection of the electrical switchgear housed in the cabinet against inclement weather and outside interventions. Their use is increasingly frequent, and it is therefore indispensable to reduce their manufacturing cost while preserving their tightness and tamper-proof qualities. A cabinet of this kind is formed by three basic parts, a bottom case, forming the back plate of the cabinet and bearing, the modular switchgear, a top cover fitted on the bottom case after the modular switchgear wiring connections have been made, and leaving access only to the front parts of the switchgear, and a cover or window adapted for opening to give access to the switchgear operating handles. The bottom case and top cover are assembled by screws with a seal fitted between them, these parts being disassembled only when access is needed to the wiring on switchgear housed in the case. The cover or window must, on the other hand, be opened at each operation and its locking and sealing device must be suited to these frequent handling operations.

The object of the present invention is to achieve a simplified locking device enabling the window to be maintained efficiently in the closed position, while allowing the lock to be actuated easily.

SUMMARY OF THE INVENTION

The cabinet according to the present invention is characterized in that one of the edges of the is joined to the cover outside the perimeter of the opening, and that the opposite edge bears a lug, also outside the opening, supporting a locking button having a latch engaging under an edge of the cover in the locking position of the button. The lug has a recess in the form of a slide in which the button is slidably mounted, slidable in a direction perpendicular to said opposite edge. Two fingers engage in the recess and extend in this direction and have an elasticity to bring them together or separate them each finger comprising an end cooperable with a ramp arranged on the edge of the recess. Each recess has an inversion point such that engagement of the button on the lug, by insertion of the fingers in the recess, draws the fingers together up to the inversion point and separates the fingers elastically after the inversion point. This separation urges the button to the locking position, and that a stop limits the return travel of the button, in the opposite unlocking direction, thereby preventing the inversion point from being passed by the ends of the fingers and to maintain a return force on the button in the locked position.

Preferably, the window bears a hollowed lug in which two flexible fingers, supported by the locking button, can be engaged. These fingers cooperate with ramps so as to maintain the lock fixed to the window, while ensuring that the button returns to the locking position. The unlocking travel of the button is limited by one or more elastic tabs which retract when the button is engaged, and clips behind the latch supported by the button. The locking button is a molded plastic part which, in the fitted position, is located in the extension of the window outside the perimeter of the opening of the cover. This lock maintains the window efficiently in the position bearing against the seal surrounding the opening, and simple sliding enables it to be unlocked and the window to pivot to the open position.

The locking button bears a sealing orifice which, in the closed position of the window, is opposite a conjugate orifice arranged on a lug of the cover. The fitting of a sealing wire both prevents the locking button from being moved in the unlocking direction and keeps the lock and window secured to the cover. One or more of the screws fixing the cover to the case can comprise a sealing device, achieved according to an improvement of the invention by an orifice arranged in the head of the screw, which comes opposite a curved hole, arranged in the cover and possibly the case. Curving of the hole makes the latter emerge on the outside and guides the sealing wire, which can be inserted via the head of the screw, emerging automatically on the outside. The locking button has on its front face a recess enabling a keylock to be fitted whose latch cooperates with a conjugate part of the cover. Wiring of the cabinet can be made easier by a notch or reduced height of a side panel, enabling the cables to be fitted and connected to the switchgear. The small side panels of the case are arranged as cable plates, and are provided to this end either with press-out parts or with any other orifice able to be blanked off, and according to an improvement of the invention, the case bears half-pillars for fixing of a terminal block in the vicinity of one or both of the small side panels. The connecting bar of the terminal block occupies the whole width of the case and is fixed to a support formed by a folded strip in the form of a frame with an open base, fixed to the two half-pillars. The strip in the form of a frame can naturally be replaced by an equivalent part made of molded plastic material, capable of being fixed, for example by screwing the strip to the two half-pillars, and constituting a spacer for fixing of the connecting bar, while liberating the passage for the wires or cables entering the cabinet.

The cover or window is advantageously made of transparent plastic material and the locking button is shaped as a bar of the same width as the window, and covering a part of the cover, outside the perimeter of the opening of the cover.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
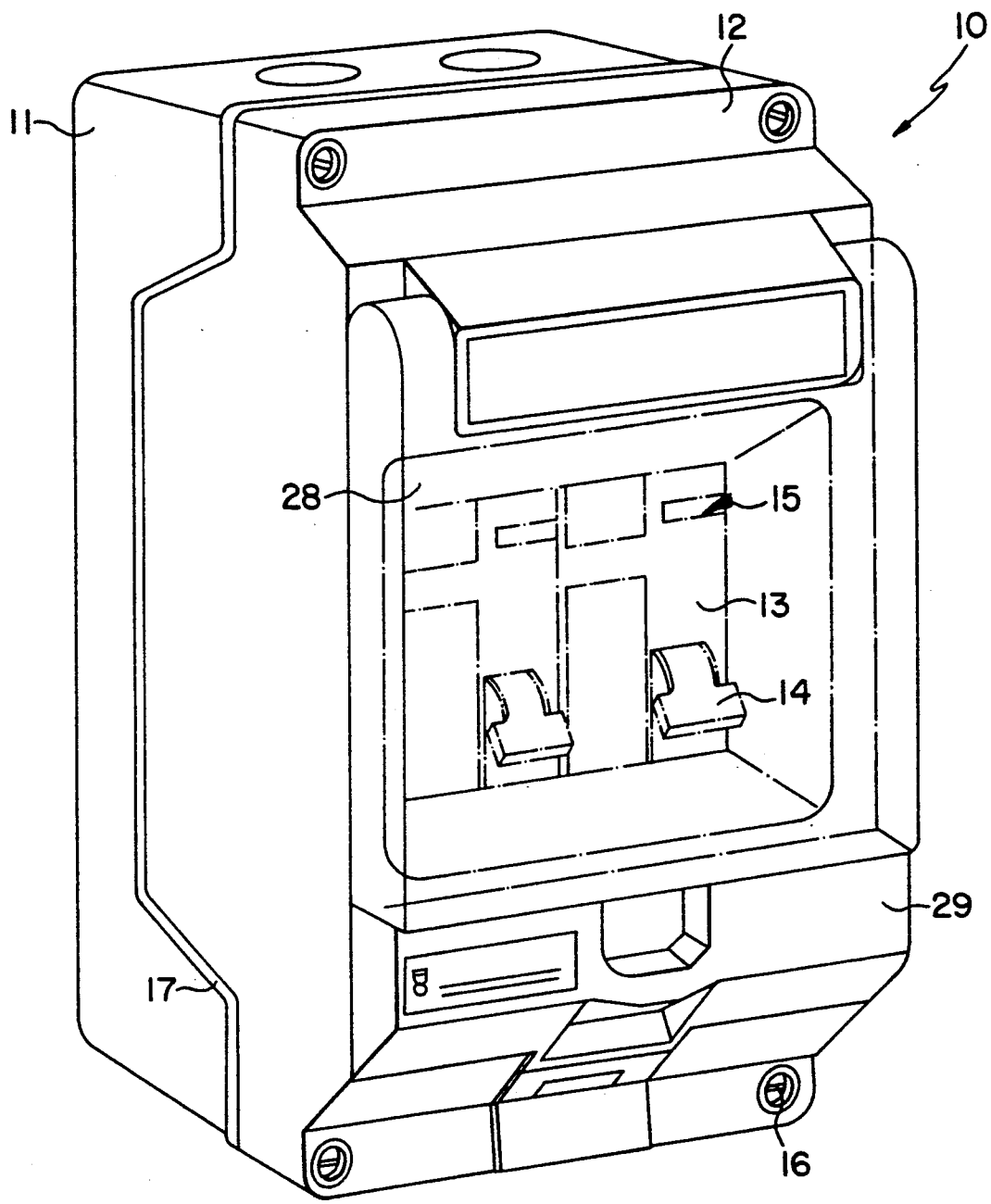
FIG. 1 is a schematic perspective view of a cabinet according to the invention, the window being represented in the locked position.
Figure 2:
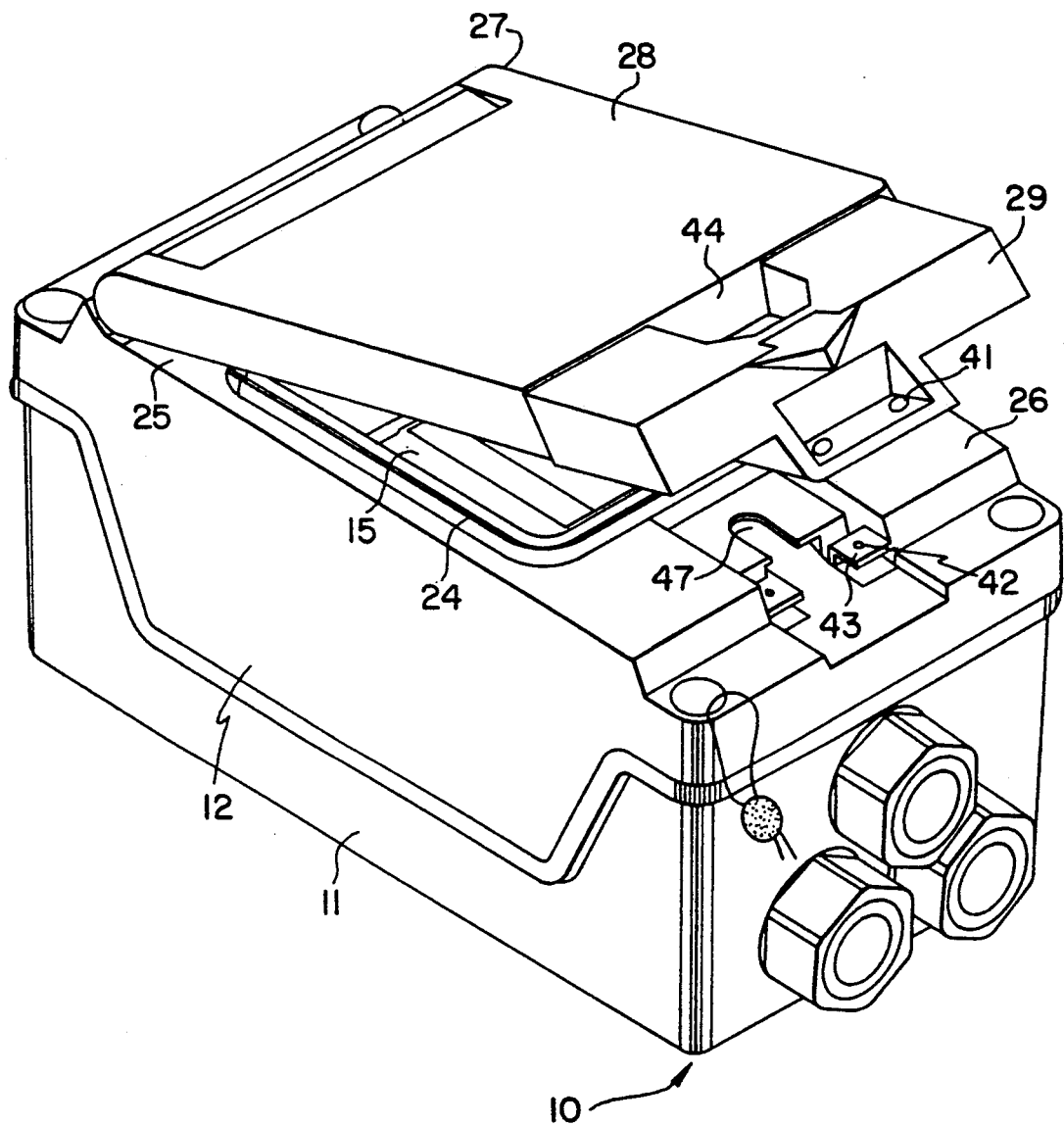
FIG. 2 is a similar view to that of FIG. 1, showing the window in the course of opening.

In the figures, a cabinet 10 made of molded plastic material is formed by a case 11 onto which a cover 12 is tightly fitted. The case 11 bears a symmetrical profile rail for clipping-on of modular electrical switchgear 13, whose front panel equipped with a handle 14 protruding out from a rectangular opening 15 arranged in the cover 12. The cover 12 is fixed to the case 11 by four screws 16, and a seal 17 is fitted between the cover 12 and case 11, being housed in a peripheral groove 18 of the case 11. The case 11 comprises a back plate 19 to which there are connected two small side panels 20, equipped with orifices 21 for the passage of the cables or wires connected to the switchgear 13, and two large side panels 22. The large side panels have a notch 23, reducing the height of these panels in the center part to enable the cables to be easily fitted and connected to the switchgear 13 housed in the case. The cover 12 is fitted on the case 11, after the wiring has been done and the switchgear 13 mounted. The cover 12 naturally has a conjugate shape to that of the case 11, to form in the fitted position a case 10 of general parallelipipedic shape.

At the edge of the rectangular opening 15 of the cover 12, there is raised edge 24 receiving a seal, this raised edge occupying almost the whole width of the cover 12, but leaving free parts 25, 26 lengthwise, on both sides. One of the free parts 25 bears an articulation 27 of a cover or window 28 covering the opening 15, in the folded-down position. The cover 28, hereinafter called window, made of transparent plastic material, is extended on the opposite side from the articulation 27 by a locking button 29, which covers the free part 26 of the cover 12 in the closed position of the window 28.

Referring more particularly to FIGS. 3 to 6, it can be seen that the edge opposite from the articulation 27 of the window 28 bears, on the outside at the periphery of the opening 15, a fixing lug 30 having a recess 31 into which a conjugate part 32 of the locking button 29 engages. The two side faces of the recess 31 are arranged as a ramp 33 having an inversion point 34 defining a narrowed passage point. The conjugate part 32 bears two fingers 35, whose angled ends 36 cooperated with the ramps 33 when the conjugate part 32 is inserted in the recess 31. The center section of the conjugate part 32 comprises as a latch 37, whose end cooperates (in the locking position) with a nose 38 arranged on the edge 24 of the opening 15. The latch 37 has on its rear part rear edges 39 designed to cooperate with two elastic tabs 40 arranged on the base of the recess 31. These tabs 40 retract when the conjugate part 32 is inserted in the recess 31, and return elastically to a latching position as soon as the rear edges 39 of the latch 37 have passed. These tabs 40 form stops limiting the return travel in the unlocking direction of the button 29. In the case represented in the figures, of fixing lug 30 and conjugate part 32, the latter are disposed on the central axis of the window 28 and button 29, but it is possible to provide that fixing lugs 30 and two conjugate part 32 arranged symmetrically to the longitudinal axis of the window 28.

Figure 3:
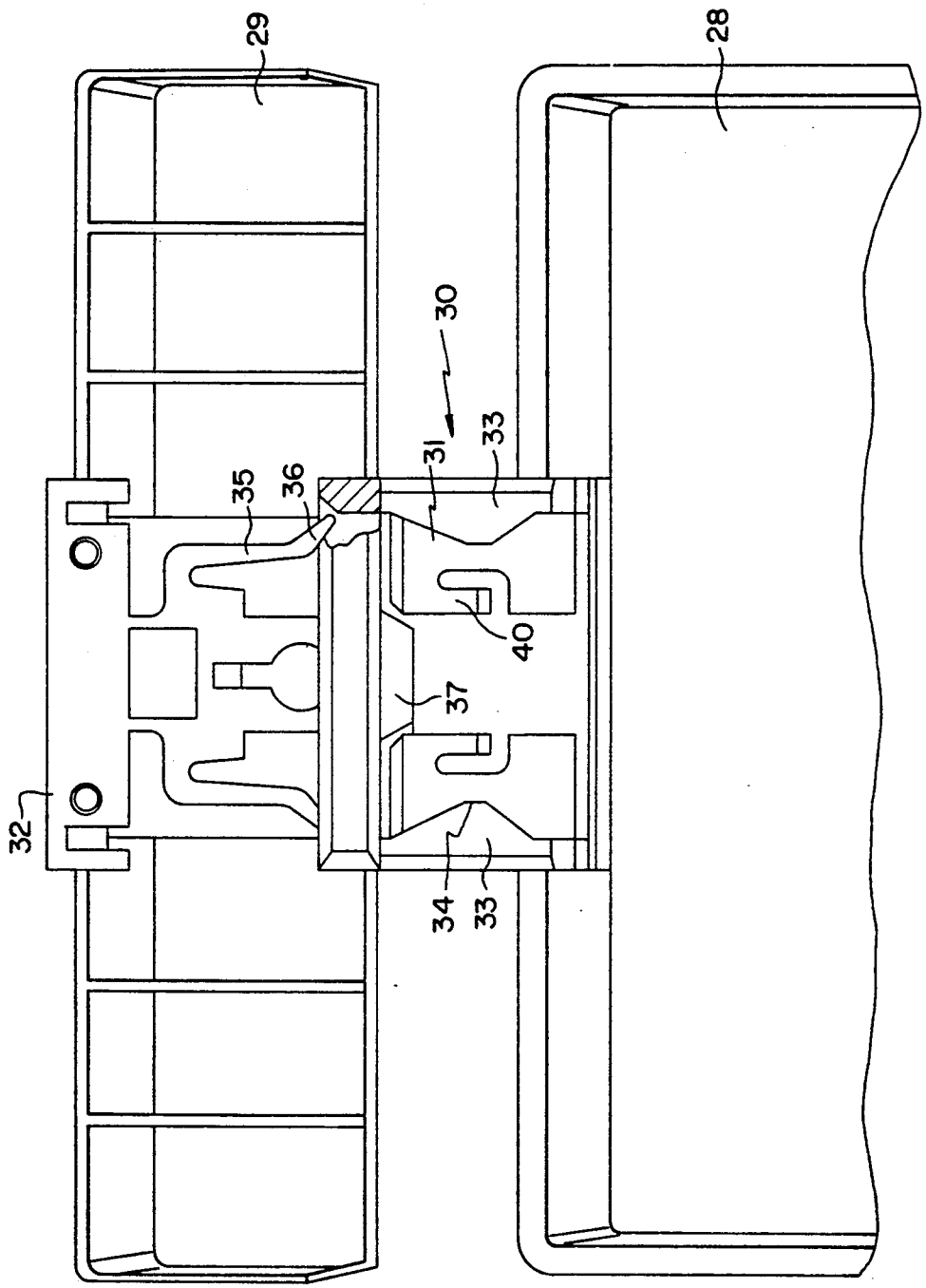
FIGS. 3, 4, 5 and 6 are top views of the end of the window and of the locking button, the latter being represented respectively in the course of engaging on the window, at the moment the inversion point is passed, in the closed (locking) position, and in the unlocked position.
Figure 4:
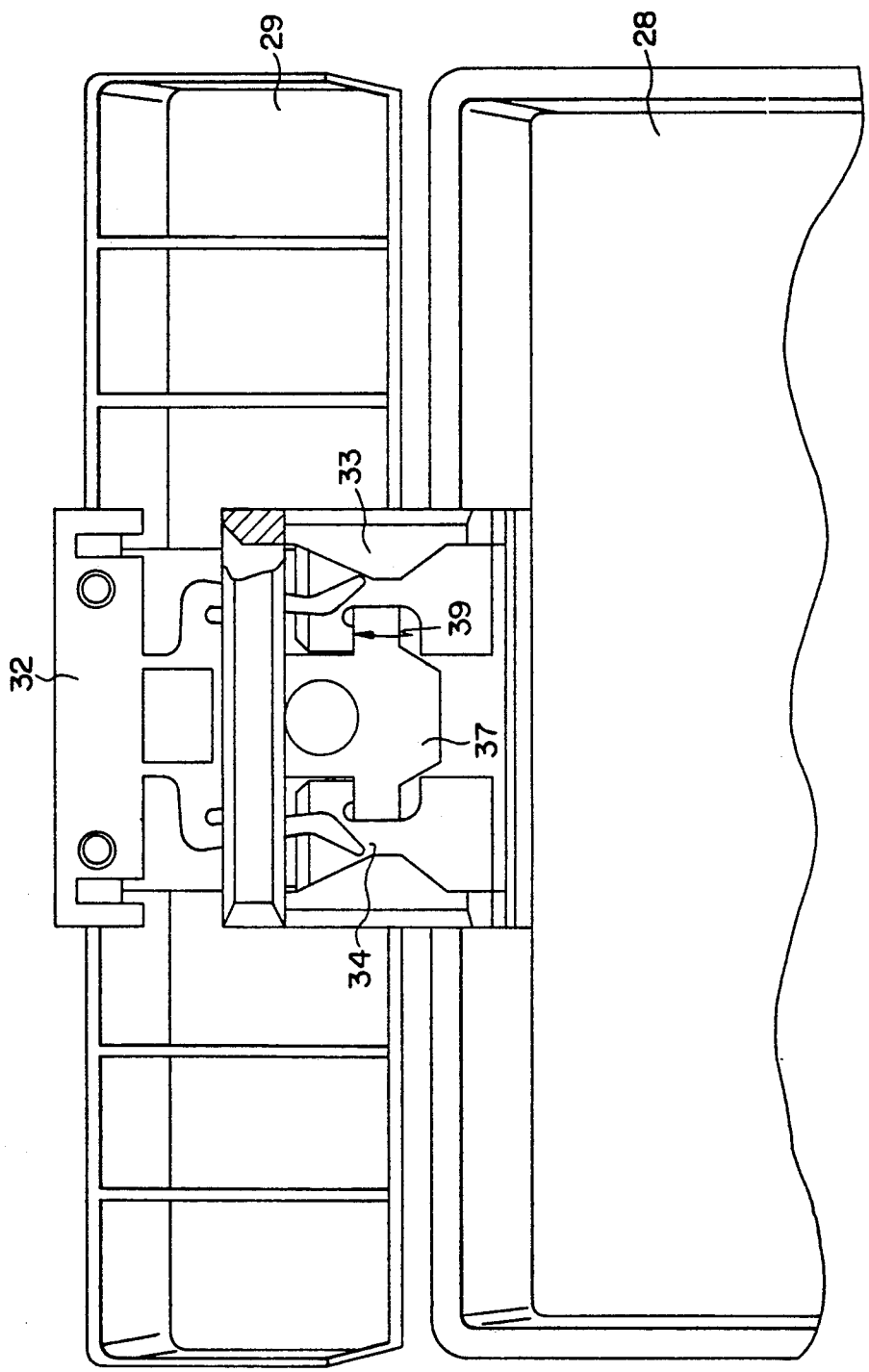
Figure 5:
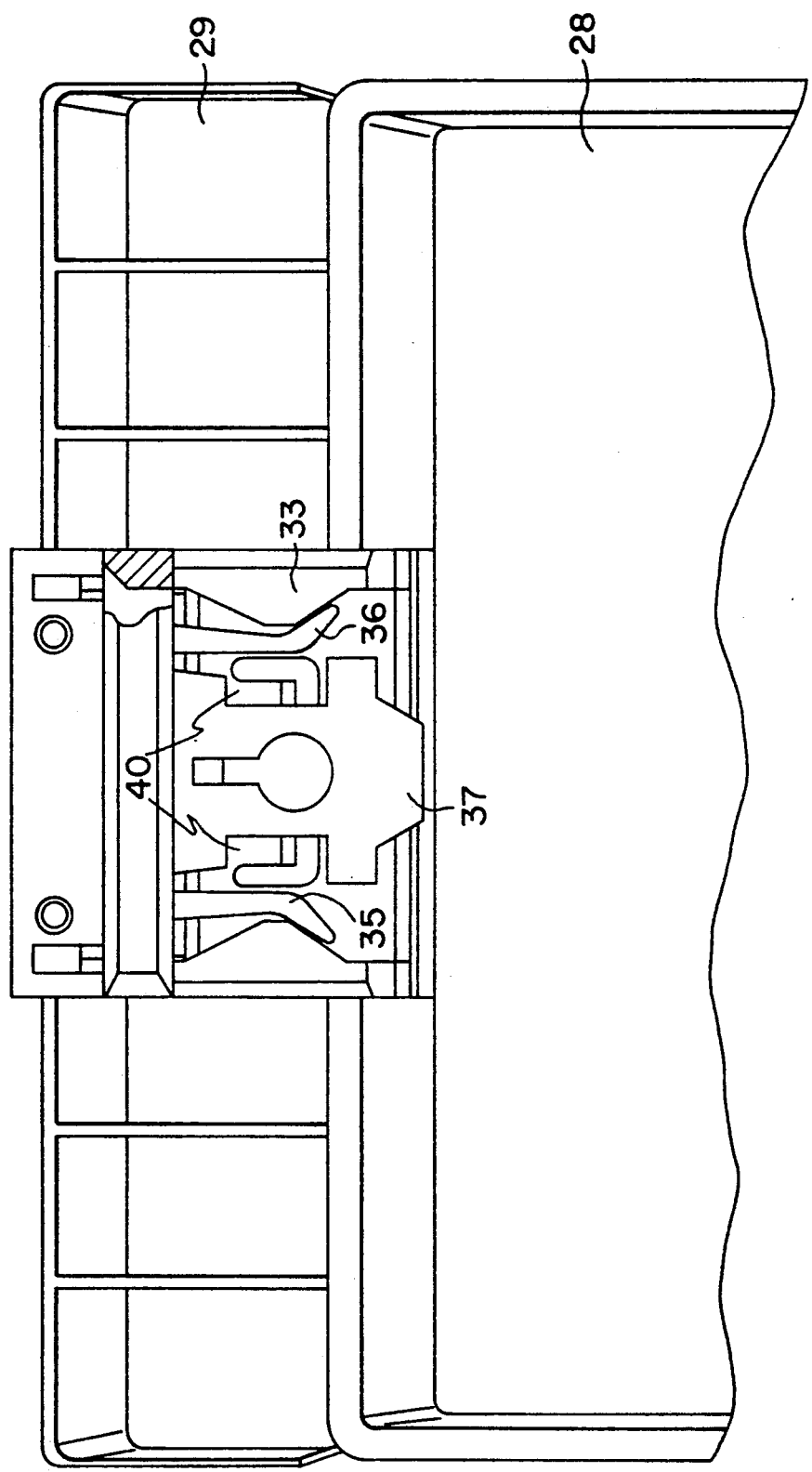
Figure 6:
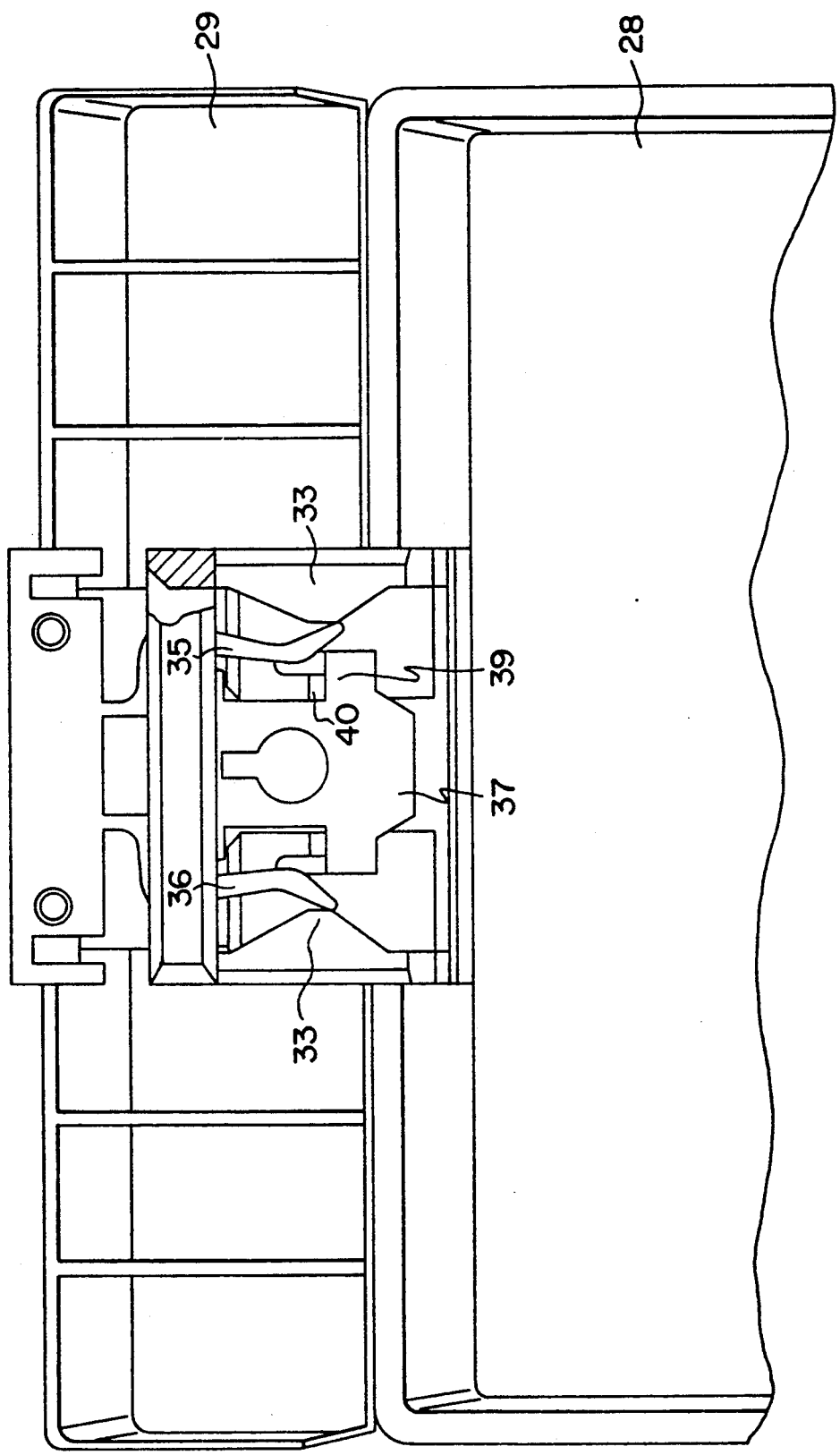

The locking button 29 is engaged on the window 28 by clipping of the conjugate part 32 into the recess 31, the ends 36 cooperating firstly with the ramps 33 of the recess 31, folding back elastically (FIGS. 3 and 4). As soon as the inversion point 34 has been passed, the ends 36 cooperate with the divergent parts of the ramps 33 and urge the button 29 to the position adjoining the window 28, which corresponds to the locking position, the latch 37 engaging under the nose 38 of the cover 12. In the course of this engagement movement, the elastic tabs 40 first fold back to give free passage to the latch 37, and then returned to the latching, position, interfering with the movement of the rear edges 39 of the latch 37. In the locked position of the button 29, the window 28 is held rigidly in contact with the raised edge 24 ensuring sealing of the opening 15. Unlocking of the window 28 is performed by a reverse movement of the button 29 in the separation direction of the window 28. This movement is limited by the tabs 40 which engage the rear edges 39 of the latch 37, this engagement taking place before the ends 36 pass the inversion point 34. In this position represented by FIG. 6, the elastic fingers 35 still exert a return force on the button 29 in the locked position by their action on the divergent parts of the ramps 33. This elastic return action is also maintained in the locked position represented in FIG. 5, the ends 36 still being in contact with the divergent parts of the ramps 33. This elastic assembly of the button 29 enables the window to be closed by simply folding it down, the latch 37 being pushed back by the inclined face of the nose 38, and then clipping under this nose to lock the window 28.

The button 29 has a sealing orifice 41, which in the closed position of the window 28 comes opposite a conjugate orifice 42 arranged on a lug 43 of the cover 12. Fitting a sealing wire prevents the button 29 from being moved in the unlocking direction and securedly unites the button 29, and therefore the window 28, to the cover 12.

The front face of the button 29 has a housing 44, capable of receiving a keylock 45 with a key (not represented). The bolt 46 of the keylock 45 engages under the edges of a cutout opening 47 of the cover 12 to securedly unite the button 29 to the cover 12. In the unlocked position of the keylock 45, the bolt 46 can be separated from the cover 12 to enable the unlocking movement of the button 29.

Figure 7:
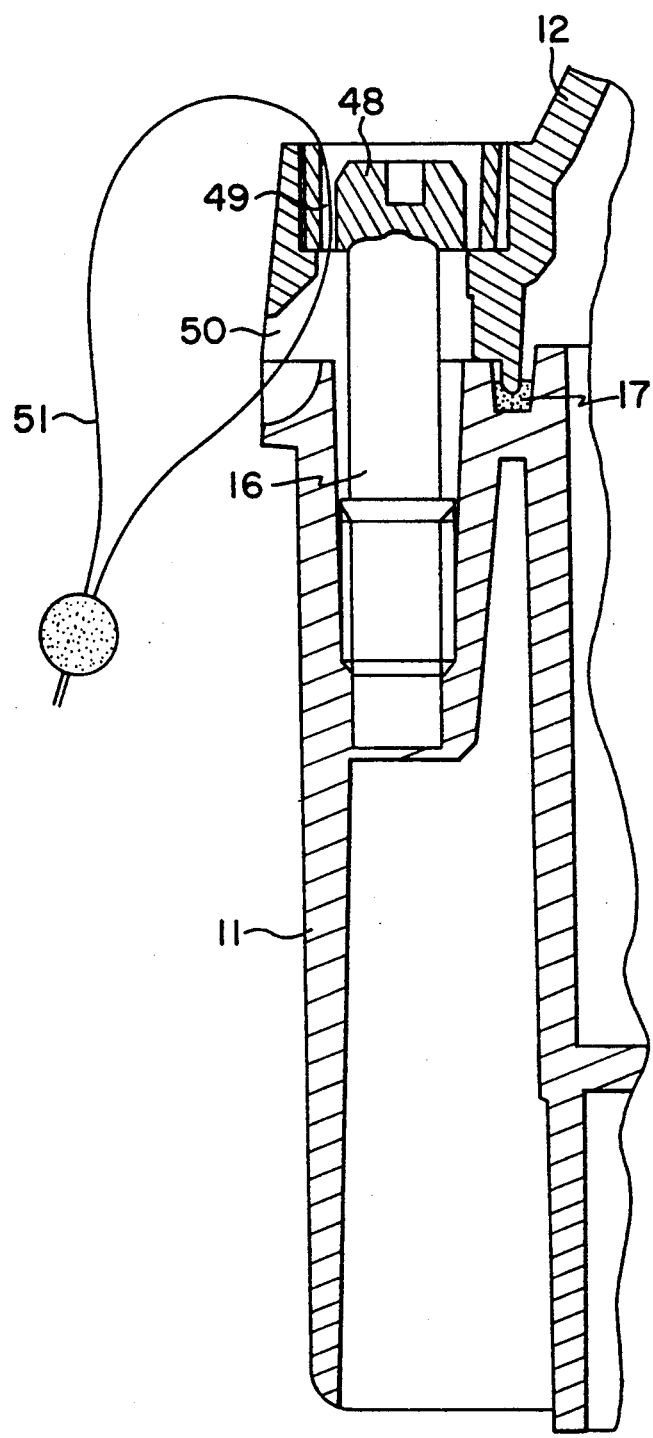
FIG. 7 is an enlarged scale cross-sectional view illustrating sealing of a fixing screw securing the cover to the case.
Figure 8:
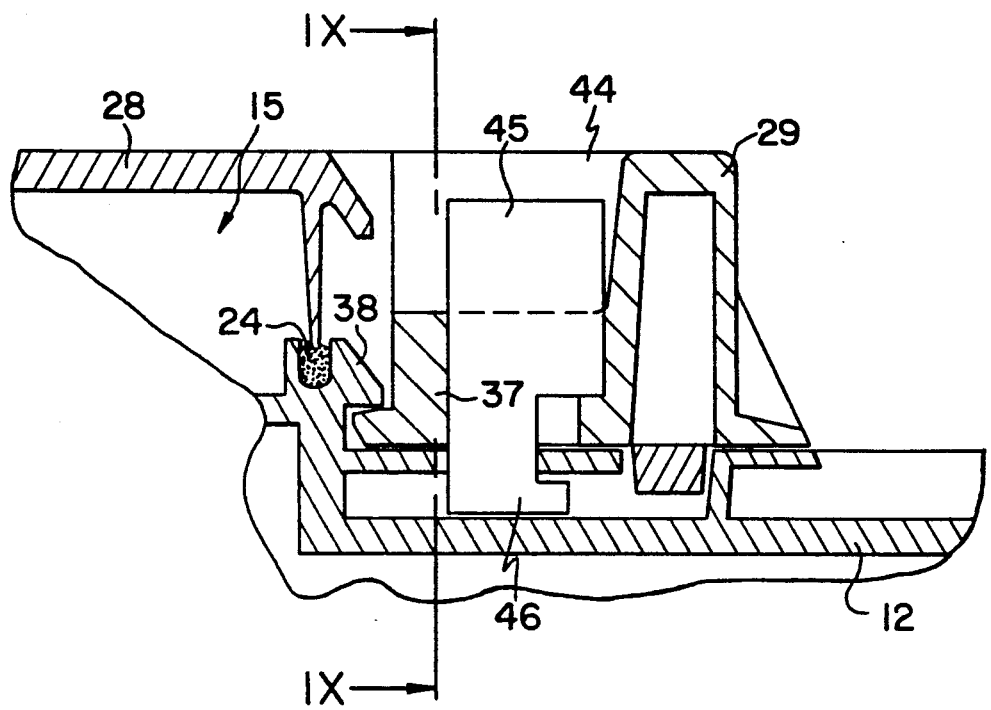
FIG. 8 is a cross-sectional view along the line VIII—VIII of FIG. 9 of the locking button equipped with a keylock represented in the open position.
Figure 9:
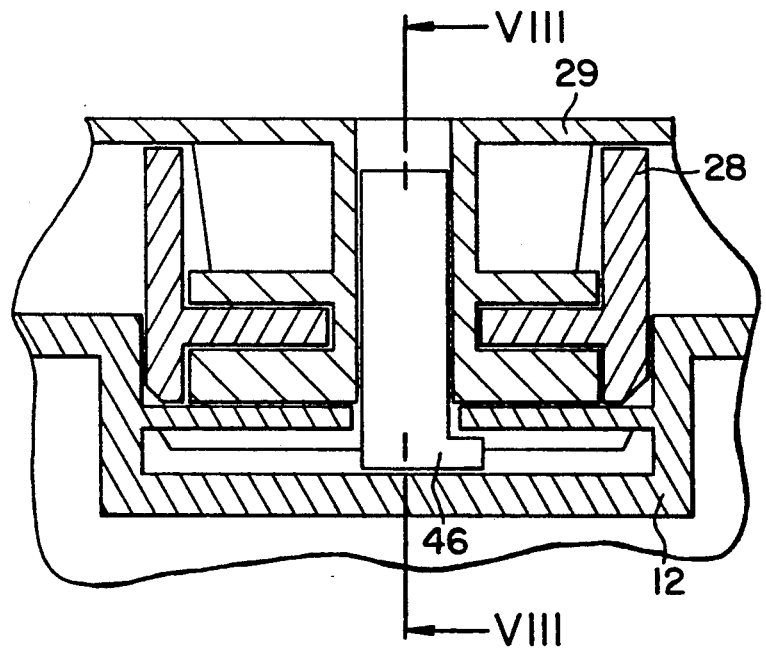
FIG. 9 is a cross-section along the line IX—IX of FIG. 8, the keylock being represented in the closed position.

Referring more particularly to FIG. 7, it can be seen that the cover 12 is fixed to the case 11 by screws 16 whose heads 48 have holes 49 for a sealing wire 51 to pass through. The hole 49 directed in the axial direction of the screw 16 emerges in an outwardly curved passage 50 arranged in the cover 12 and extending into the case 11. It can be understood that by inserting the sealing wire 51 in the head 48, the end of this wire 51 is guided by the curved orifice 50 to the outside, where it can easily be caught hold of and secured to the other end of the wire. By sealing one or more screws 16, and the locking button 29, the cabinet 10 is rendered tamperproof.

Figure 10:
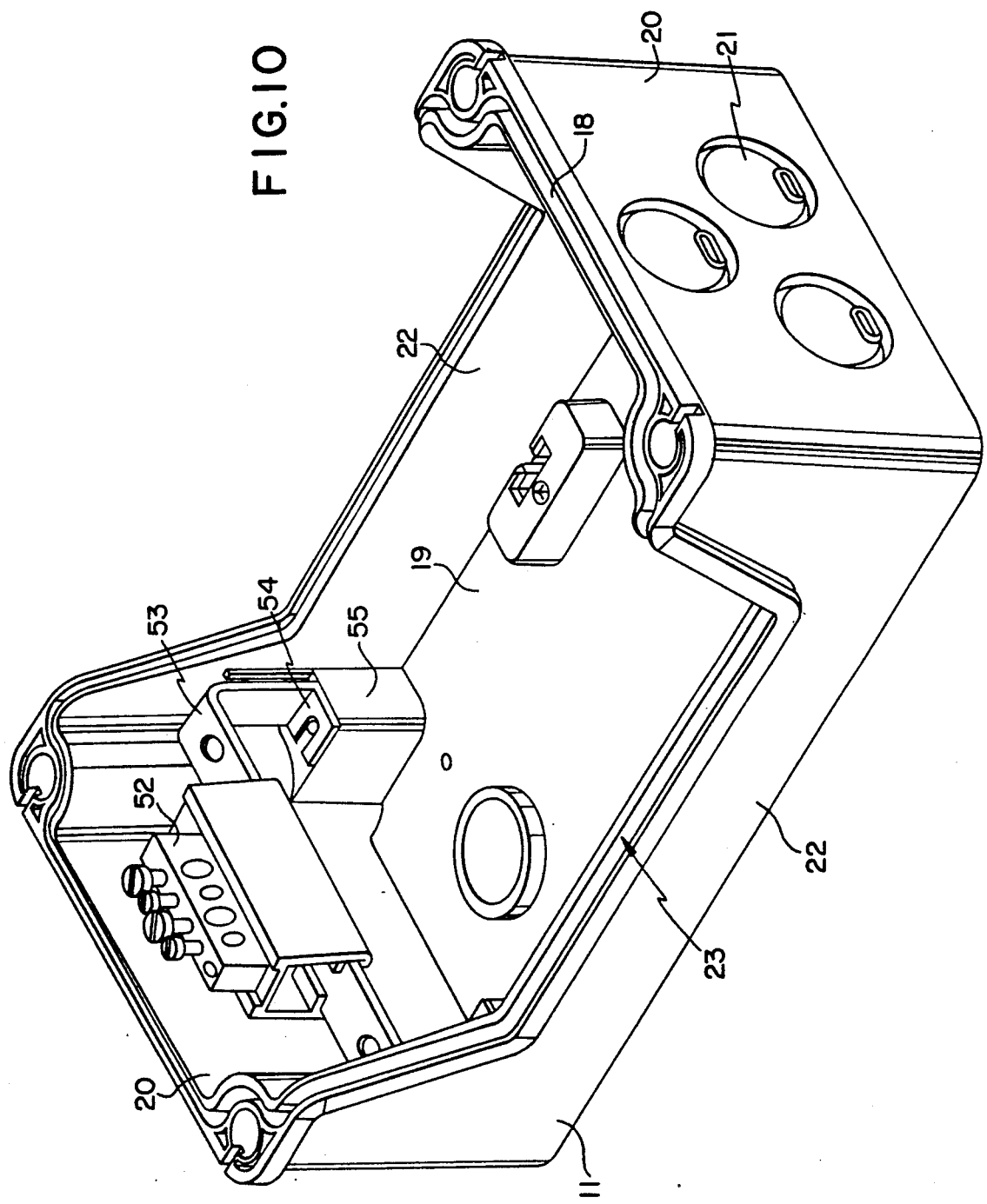
FIGS. 10 and 11 are perspective views of the case, equipped respectively with a metal support of a connection terminal block, and with a plastic support of the terminal block.

FIG. 10 represents a device for fixing a terminal block 52, extending along one of the small side panels 20 of the case 11. According to the invention, the terminal block 52 is clipped onto a support defined by folded flat iron frame 53, to form a frame whose base is open. This frame 53 is fixed by the folded lugs 54 to half-pillars securedly united to the case 11, and cast with the latter. It can easily be seen that this fixing mode, for example by screws, enables the whole width of the case 11 to be liberated for the terminal block 52, the frame 53 constituting at the same time a spacer liberating the passage for connecting cables or wires.

Figure 11:
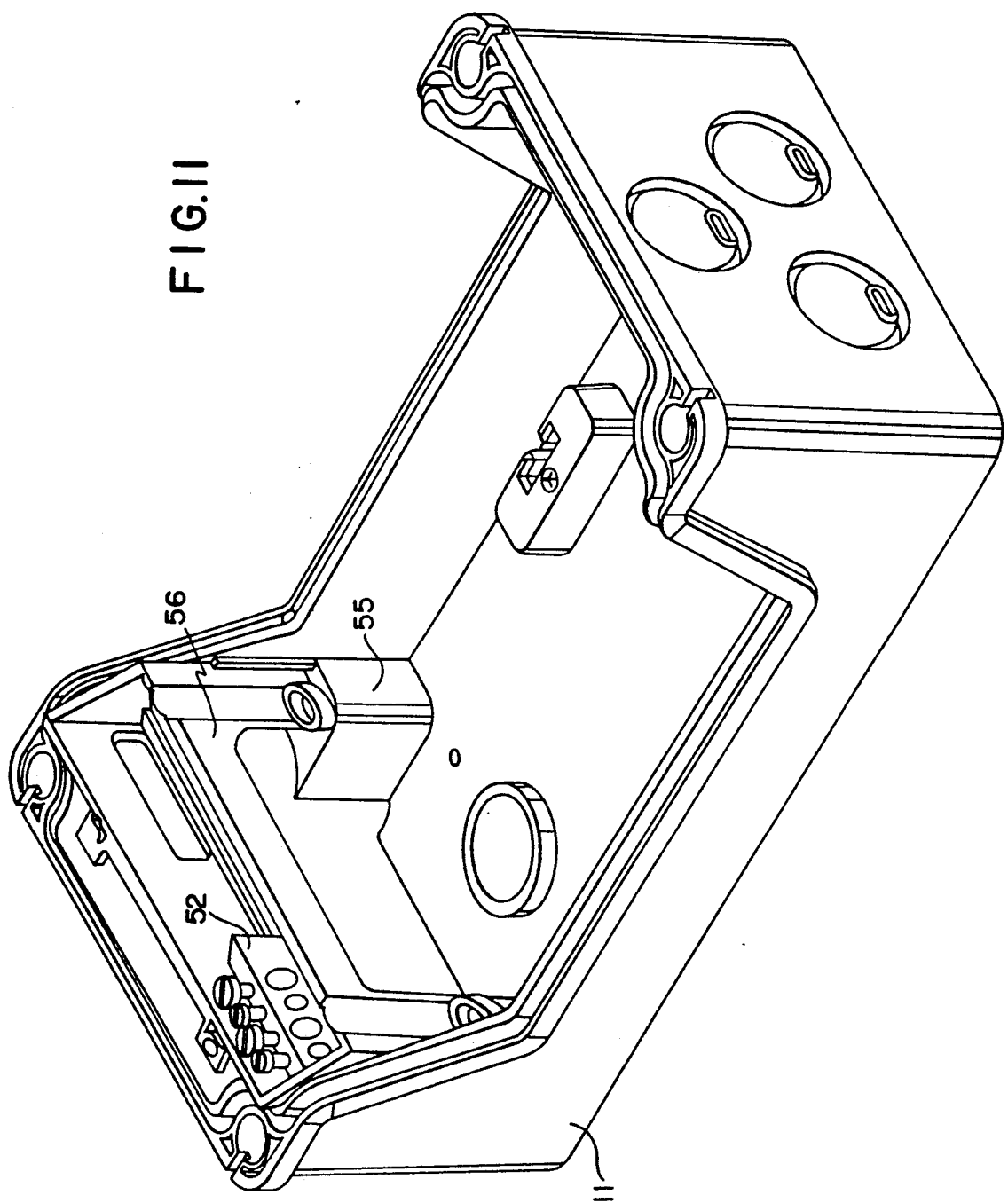

FIG. 11 illustrates an alternative embodiment of a terminal block achieved by bracket 56 which advantageously may be molded plastic that can be screwed onto the half-pillars 55. The terminal block 52 is fixed by clipping or any other means to the bracket 56. The whole width of the case 11 can be occupied by the terminal block 52.

The cabinet is made up of a limited number of molded plastic parts, its manufacturing and assembly cost being relatively low. Sealing is ensured by the seals between the case and cover, and between the cover and window. Opening of the window 28 is achieved by a simple action on the button 29, a spring possibly being able to move the window 28 to the open position. The location of the button 29 in the extension of the window 28 overlapping the free part 26 gives the cabinet a particular aesthetic appearance and avoids any dangerous protuberances.

The position of the symmetrical profile rail is adjustable in depth and can occupy two distinct positions by means of fixing spacers for fixing to the back plate of the case. The spacers are advantageously arranged as end stops of the switchgear clipped onto the rail.

The invention is in no way limited to the embodiment more particularly described herein.

We claim:

1. A sealed cabinet for housing modular electrical switchgear comprising:

a bottom case having four side panels and a back plate;

a top cover for covering said bottom case, said top cover comprising an opening for the passage of handles of the switchgear therethrough;

a window cooperable with said top cover to seal said opening, said window adapted for rotation about a rotation axis to rotate between open and closed positions, wherein said open position allows for access to the switchgear handles and said closed position restricts access to the switchgear handles;

a raised edge on said cover cooperable with said window to tightly seal said cover and said window to each other;

a lug attached to said window at an edge opposite said rotation axis;

a slidable locking button having a latch adapted for detachable engagement with a nose of said cover, said locking button being supported by said lug, said locking button including two elastic fingers attached to said latch such that said latch and said fingers are slidable within a recess in said lug, said fingers having angled ends;

ramps disposed on opposite sides of said recess, said ramps cooperable with said angled ends of said fingers such that said fingers are squeezed towards each other and released when said locking button is pushed into a locking position, said fingers thereby providing a biasing force for urging said locking button into said locking position; and stop means for limiting movement of said locking button from said locking position past an unlocking position.

2. The device of claim 1, wherein said stop means is defined by an elastic tab such that said elastic tab allows said locking button to be moved into said locking position, and prevents said locking button from being moved past said unlocking position.

3. The device of claim 1, wherein said locking button includes a sealing orifice cooperable with a conjugate sealing orifice in said lug such that a sealing wire is passable through said sealing orifice and said conjugate sealing orifice.

4. The device of claim 1, wherein said locking button extends substantially over the entire width of said window.

5. The device of claim 1, wherein said cover and said bottom case are fastened together by screws each having an orifice extending in the axial direction of said screws, and said top cover further comprises a passage such that a sealing wire is passable through said orifice and said passage.

6. The device of claim 1, wherein said locking button further comprises a housing adapted for a key lock, said key lock comprising a lock bolt, said top cover further comprising an orifice for receiving said lock bolt.

7. The device of claim 1, further comprising a first pillar fixed said bottom case and adjacent to a side panel and a second pillar fixed to said bottom case and adjacent to a second side panel opposite said first side panel, a support supported by said first and second pillars, and a terminal block supported by said support.

8. The device of claim 7, wherein said support is molded plastic.

9. The device of claim 7, wherein said support is a folded flat iron frame.

10. The device of claim 1, wherein said window is made of transparent plastic material.

* * * * *